(12) United States Patent
Juan et al.

(10) Patent No.: US 11,565,219 B2
(45) Date of Patent: Jan. 31, 2023

(54) MICRO-BUBBLE GENERATOR

(71) Applicant: Cheng-Lung Juan, Kaohsiung (TW)

(72) Inventors: Ching-Yuan Juan, Kaohsiung (TW);
Yi-Hung Juan, Kaohsiung (TW);
Cheng-Lung Juan, Kaohsiung (TW)

(73) Assignee: Cheng-Lung Juan, Kaohsiung (TW)

( * ) Notice: Subject to any disclaimer, the term of this patent is extended or adjusted under 35 U.S.C. 154(b) by 135 days.

(21) Appl. No.: 17/169,116

(22) Filed: Feb. 5, 2021

(65) Prior Publication Data

US 2021/0154626 A1 May 27, 2021

Related U.S. Application Data

(63) Continuation of application No. 16/001,497, filed on Jun. 6, 2018, now Pat. No. 10,946,347.

(30) Foreign Application Priority Data

Aug. 22, 2017 (TW) .................................. 106128412

(51) Int. Cl.
| | | |
|---|---|---|
| *B01F 3/04* | (2006.01) | |
| *B01F 23/232* | (2022.01) | |
| *E03C 1/084* | (2006.01) | |
| *F16K 47/08* | (2006.01) | |
| *B01F 25/312* | (2022.01) | |
| *B01F 25/432* | (2022.01) | |
| *B01F 25/452* | (2022.01) | |
| *B01F 101/00* | (2022.01) | |

(52) U.S. Cl.
CPC ...... *B01F 23/2323* (2022.01); *B01F 25/3121* (2022.01); *B01F 25/4323* (2022.01); *B01F 25/4523* (2022.01); *E03C 1/084* (2013.01); *F16K 47/08* (2013.01); *B01F 2101/305* (2022.01); *Y02W 10/10* (2015.05)

(58) Field of Classification Search
CPC .............. B01F 23/2323; B01F 25/3121; B01F 25/4323; B01F 25/4523; B01F 2101/305; E03C 1/084; F16K 47/08; Y02W 10/10
USPC ...................... 261/76, 77, DIG. 75
See application file for complete search history.

(56) References Cited

U.S. PATENT DOCUMENTS

| | | |
|---|---|---|
| 2,624,559 A | 1/1953 | Hyde |
| 2,717,614 A | 9/1955 | Palivos |
| 2,747,930 A | 5/1956 | Hyde |
| 2,990,885 A | 7/1961 | Brazier |
| 3,533,553 A | 10/1970 | Britzman |
| 5,495,985 A | 3/1996 | Nehm et al. |
| 5,628,623 A | 5/1997 | Skaggs |
| 6,708,902 B2 | 3/2004 | Takeshi et al. |
| 7,513,488 B2 | 4/2009 | Virtanen et al. |
| 7,913,984 B2 | 3/2011 | Noguchi |
| 8,950,435 B2 | 2/2015 | Lin |

(Continued)

*Primary Examiner* — Charles S Bushey
(74) *Attorney, Agent, or Firm* — Muncy, Geissler, Olds & Lowe, P.C.

(57) ABSTRACT

A micro-bubble generator is provided between an input end and an output end of a water outlet device. The micro-bubble generator includes a water inlet member and a water outlet member. A gas inlet gap is remained between the water inlet member and the water outlet member, with the gas inlet gap being communicated to external air, such that the external air is allowed to enter the micro-bubble generator for gas-liquid mixing and generate minute and dense bubbles.

15 Claims, 19 Drawing Sheets

(56) References Cited

U.S. PATENT DOCUMENTS

| | | | |
|---|---|---|---|
| 9,822,515 B2 | 11/2017 | Wu | |
| 10,035,110 B2 * | 7/2018 | Wu | B01F 25/31242 |
| 10,695,726 B2 | 6/2020 | Tian et al. | |
| 10,946,347 B2 * | 3/2021 | Juan | B01F 25/4323 |
| 11,021,857 B2 * | 6/2021 | Juan | B01F 23/23123 |
| 2017/0304782 A1 | 10/2017 | Wu et al. | |
| 2019/0330829 A1 | 10/2019 | Juan et al. | |

* cited by examiner

MICRO-BUBBLE GENERATOR

CROSS REFERENCE TO RELATED APPLICATIONS

This application is a Continuation of U.S. patent application Ser. No. 16/001,497, filed on Jun. 6, 2018, now U.S. Pat. No. 10,946,347, for which priority is claimed under 35 U.S.C. § 120; and this application claims priority of Application No. 106128412 filed in Taiwan on Aug. 27, 2017 the entire contents of all of which are hereby incorporated by reference.

FIELD OF THE INVENTION

The present invention is related to a micro-bubble generator, particularly to a micro-bubble generator being provided on a water outlet device as well as capable of increasing gas content of water stream and degree of miniaturization of bubbles.

BACKGROUND OF THE INVENTION

An existing aerator is primarily composed of a pump, a water outlet pipe and a gas-liquid mixing pipe. In the structure of the aerator, the volume of bubble of water stream being flowing through the gas-liquid mixing pipe is determined by the capacity of a gas inlet pipe and water pressure of the pump. Further, it is necessary for the water pressure of the pump to maintain the water stream to achieve a flow rate over a certain level, so as to form gas-liquid mixing. Thus, it is impossible for a user to change the average volume of bubbles generated within the gas-liquid mixing pipe arbitrarily. If finer bubbles are required by the user for water purification, this requirement will not be met by the existing aerator. In addition, the gas content of the liquid-gas mixing liquid generated by the existing bubble mixing device is too low to generate water-gas mixing liquid containing a large amount of dense bubbles in milky-white color. Thus, how to eliminate the drawbacks of existing technology described above is truly the problem to be overcome by the industry desirably.

SUMMARY OF THE INVENTION

It is one object of the present invention to eliminate drawbacks of insufficient gas content and bubble density and etc., of the existing liquid-gas mixing device.

For achieving the above object, the present invention provides a micro-bubble generator located between an input end and an output end of a water outlet device. The micro-bubble generator includes a water inlet member and a water outlet member. The water inlet member includes a first main body adjacent to the input end, and a first channel penetrating the first main body, the first main body being provided at one end penetrated by the first channel with a first junction surface. The water outlet member includes a second main body adjacent to the output end, and a second channel penetrating the second main body, the second main body being provided at one end penetrated by the second channel with a second junction surface. In this manner, the water inlet member and the water outlet member are abutted against each other, with the first junction surface facing the second junction surface, the first channel being communicated with the second channel, and the engagement between the first junction surface and the second junction surface remaining a gas inlet gap, the gas inlet gap communicating external air to the first channel and the second channel.

Furthermore, the water inlet member includes a plurality of first branching channels arranged alongside of the first channel, while the water outlet member includes a plurality of second branching channels arranged alongside of the second channel. Moreover, the engagement between the first branching channel and the second branching channel is communicated with the gas inlet gap.

Furthermore, the water inlet member, on one side adjacent to the input end, includes a raised platform penetrated by the first channel, and a notch depressed around the raised platform and penetrated by each first branching channel.

Furthermore, each first branching channel and/or each second branching channel may be inclined with respect to the first channel and the second channel, respectively.

Furthermore, the micro-bubble generator further includes a sleeve and an air vent perforation penetrating the sleeve. The water inlet member and the water outlet member may be put into the sleeve and fixed, while the gas inlet gap is communicated with the air vent perforation.

Furthermore, the micro-bubble generator further includes an eddy current guiding pipe located at one end, adjacent to the second main body, of the sleeve, the eddy current guiding pipe including a plurality of blades in a spiral manner, a plurality of eddy current passages, wherein each of the plurality of eddy current passages is arranged between two of the plurality of blades, and an outer casing tube surrounding the plurality of blades and the plurality of eddy current passages, a plurality of stepped surfaces being provided on a surface of each of the plurality of blades corresponding to each of the plurality of eddy current passages.

Furthermore, the water outlet member includes a through-hole end cap located between the second main body and the output end, and a bubble-miniaturizing net located between the through-hole end cap and the second main body. The water outlet member additionally includes a projecting edge extending toward the output end from the through-hole end cap. The water outlet member further includes a water outlet chamber adjacent to the output end and connected to the second main body. The micro-bubble generator further includes an eddy current guiding pipe provided within the water outlet chamber, the eddy current guiding pipe including a plurality of blades in a spiral manner, a plurality of eddy current passages, wherein each of the plurality of eddy current passages is arranged between two of the plurality of blades, and an outer casing tube surrounding the plurality of blades and the plurality of eddy current passages, a plurality of stepped surfaces being provided on a surface of each of the plurality of blades corresponding to each of the plurality of eddy current passages.

Furthermore, the first junction surface or the second junction surface is depressedly provided with a gasket groove, and the gasket groove is provided therein with a gasket slightly projecting outside of the gasket groove, the drop between the gasket and the gasket groove being provided to remain the gas inlet gap to the smallest extent when the first junction surface and the second junction surface are abutted against each other.

Furthermore, the micro-bubble generator further includes a regulating part, the regulating part including a regulating room constituted by corresponding depressions in the first junction surface and the second junction surface, a regulating screw rod screwedly provided in the regulating room, and an inner thread screwedly threaded with the regulating screw rod. In addition, the regulating screw rod may be also fixed in the regulating room by riveting.

Furthermore, the micro-bubble generator further includes a position-limiting part, the position-limiting part including a position-limiting room constituted by corresponding depressions in the first junction surface and the second junction surface, and a position-limiting bolt movably provided in the position-limiting room, in which the regulating screw rod may be operated in a rotating manner to change the depth of screw-threaded connection between the regulating screw rod and the inner thread, as well as drive the water inlet member and the water outlet member to be far away from or close to each other. Moreover, the maximum extent to which the water inlet member and the water outlet member are far away from each other is determined by the position-limiting part.

Furthermore, the regulating part includes a regulating screw head moved along with the regulating screw rod, a fixing ring fixing the regulating screw head to the inner wall of the regulating room, the fixing ring being openly provided with an operating through-hole allowing a tool passing therethrough and operating the regulating screw head, and a plurality of water-passing holes allowing water stream passing therethrough.

Furthermore, the water outlet member includes at least one bubble-multiplying part provided at one side, far away from the first main body, of the second main body, the bubble-multiplying part including a multiplying net and a spacing ring connected to the multiplying net.

It is another object of the present invention to provide a micro-bubble generator located between an input end and an output end of a water outlet device. The micro-bubble generator includes an accommodating part and a bubble-multiplying part. The accommodating part includes a first accommodating trough adjacent to the input end, a plurality of accommodating channels communicated with the first accommodating trough, and a second accommodating trough adjacent to the output end and communicated with each accommodating channel. The bubble-multiplying part includes a plurality of spacing rings concentrically provided within the second accommodating trough, and a plurality of multiplying nets provided between the spacing rings, respectively.

The micro-bubble generator of the present invention may be mounted to the water outlet of the faucet or the middle piping of the shower head, so as to generate a large amount of minute bubbles only by the force of water stream without the need for additional other power sources. The direction of inflow gas in the present invention is not restricted by the drill hole, so as to obtain fragmental bubbles, which are more and denser than those in the existing bubble generator, and further enhance the effect of washing, sterilization and pesticide degradation.

DETAILED DESCRIPTION OF THE PREFERRED EMBODIMENTS

Figure 1:
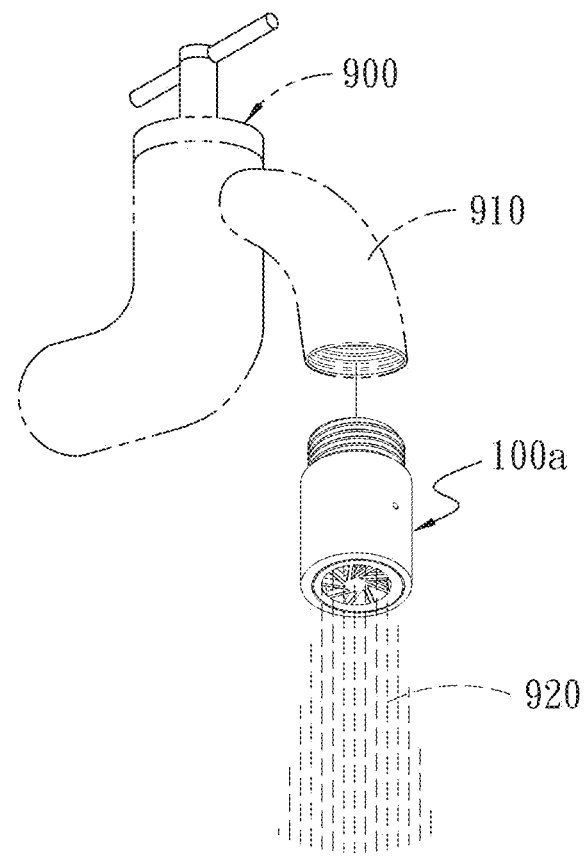
FIG. 1 is a disassembled perspective view of a micro-bubble generator and a water outlet device of the present invention.

Regarding the technology of the present invention, referring to FIG. 1, the present invention provides a micro-bubble generator 100a located between an input end 910 and an output end 920 of a water outlet device 900, the water outlet device 900 probably being a shower head, faucet and so on. The micro-bubble generator 100a may be provided inside the interior piping of the water outlet device 900, or installed outside of the water outlet device 900 as illustrated in FIG. 1 without limitation in the present invention.

Figure 2:
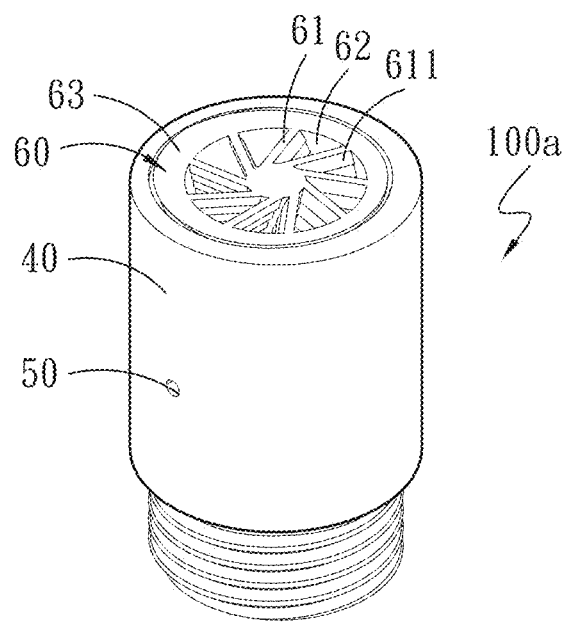
FIG. 2 is an assembled perspective view of a first embodiment of the present invention.
Figure 3:
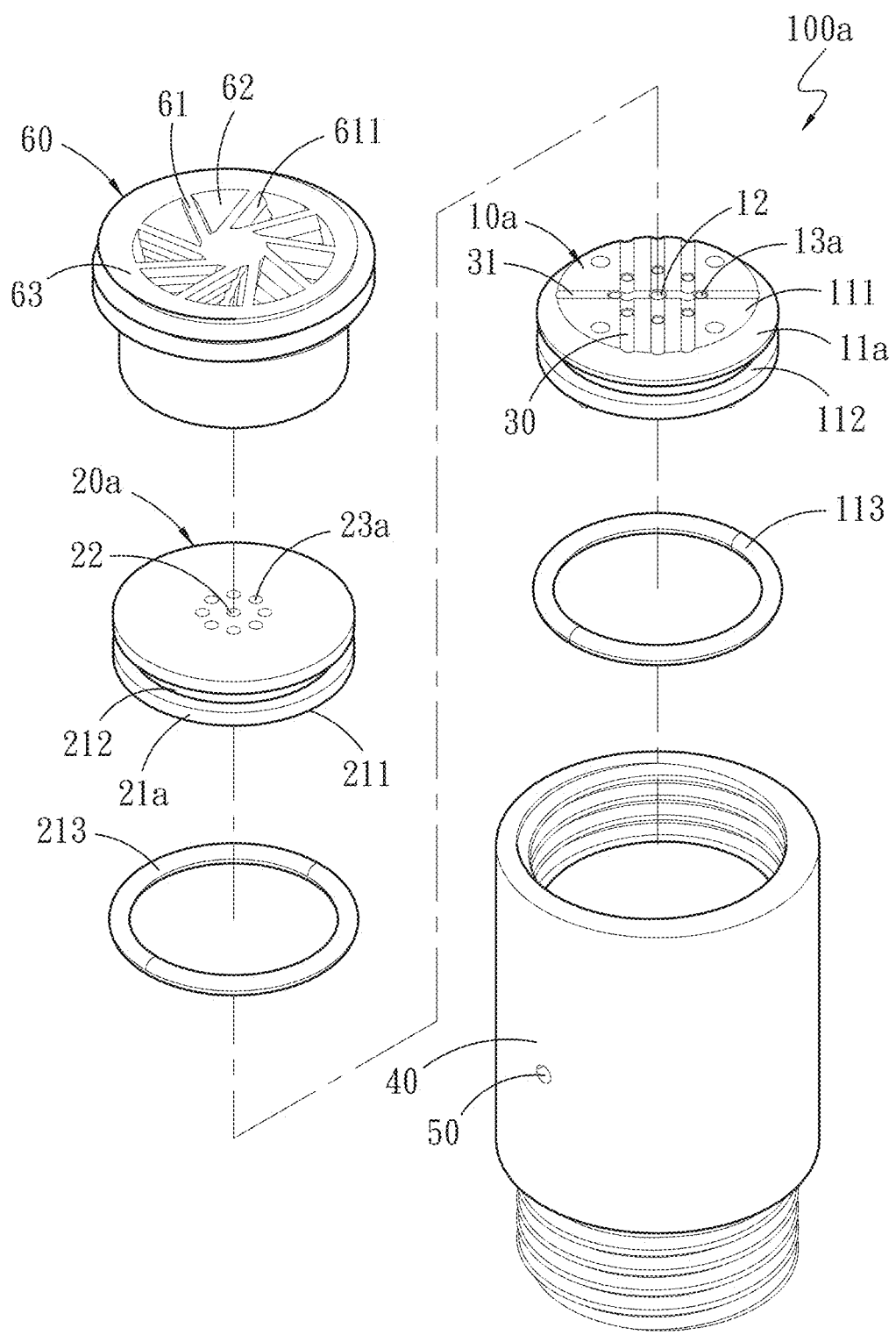
FIG. 3 is a disassembled perspective view of the first embodiment of the present invention.
Figure 4:
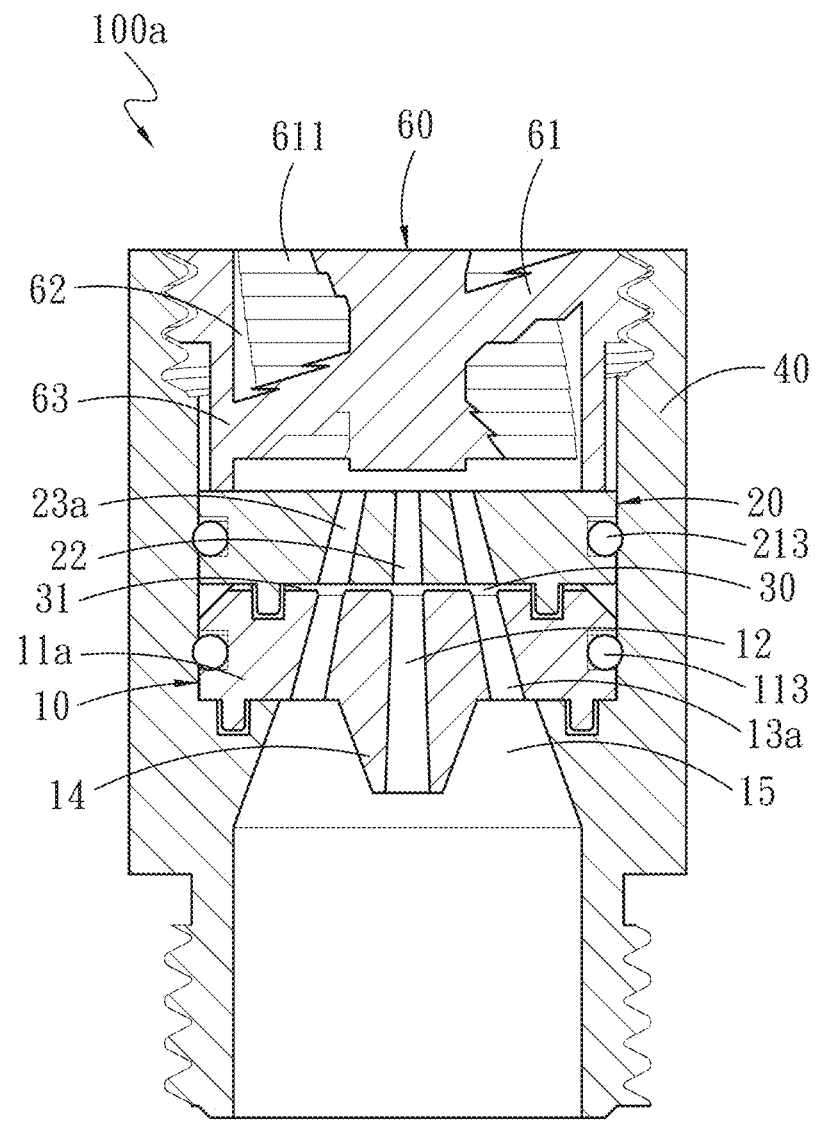
FIG. 4 is a cross-sectional view of the first embodiment of the present invention.

Specifically speaking, referring to FIGS. 2, 3 and 4, the micro-bubble generator 100a includes a water inlet member 10a and a water outlet member 20a. The water inlet member 10a includes a first main body 11a adjacent to the input end 910, and a first channel 12 penetrating the first main body 11a, the first main body 11a being provided at one end penetrated by the first channel 12 with a first junction surface 111. The water outlet member 20a includes a second main body 21a adjacent to the output end 920, and a second channel 22 penetrating the second main body 21a. In this case, it is preferable that the aperture of the second channel 22 should be larger than that of the first channel 12 slightly. The second main body 21a is provided at one end penetrated by the second channel 22 with a second junction surface 211. In this manner, the water inlet member 10a and the water outlet member 20a are abutted against each other, with the first junction surface 111 facing the second junction surface 211, the first channel 12 being communicated with the second channel 22, and the engagement between the first junction surface 111 and the second junction surface 211 remaining a gas inlet gap 30, the gas inlet gap 30 communicating external air to the first channel 12 and the second channel 22.

The gas inlet gap 30 is provided with a plurality of chiseled shallow recesses 31 on the first junction surface 111 or the second junction surface 211, and it is necessary for each shallow recess 31 to pass through two arbitrary points on the peripheral of the first junction surface 111 or the second junction surface 211. After the first junction surface 111 and the second junction surface 211 are joined face to face, slits formed by the shallow recesses 31 are then considered as the gas inlet gap 30. In addition, it is necessary for the gas inlet gap 30 to pass through external air from joints between the first channel 12 and the second channel 22, so as to enable external air to be communicated to the first channel 12 and the second channel 22. On the boundary, a negative pressure is generated, so as to suck external air through the gas inlet gap 30 when the water stream flows into the second channel 22 from the first channel 12 according to the above structure. Thus, the effect of bubble generation due to liquid-gas mixing is achieved.

In this embodiment, the water inlet member 10a includes a plurality of first branching channels 13a arranged alongside of the first channel 12, while the water outlet member 20a includes a plurality of second branching channels 23a arranged alongside of the second channel 22. In this case, the aperture of the second branching channel 23a is preferably larger than that of each first branching channel 13a, and the engagement between the first branching channel 13a and the second branching channel 23a is communicated with the gas inlet gap 30. Each first branching channel 13a and each second branching channel 23a are preferably arranged to be respectively centered at the first channel 12 and the second channel 22, for facilitating even suction of external air at various angles, such that gas inflow of liquid-gas mixing is increased. In addition, the water inlet member 10a, on one side adjacent to the input end 910, includes a raised platform 14 penetrated by the first channel 12, and a notch 15 depressed around the raised platform 14 and penetrated by each first branching channel 13a. The water stream flowing into each first branching channel 13a is accelerated so as to increase gas inflow due to the gradually narrowed cross-sectional area of the path, when the water stream flows through the notch 15.

Further, each first branching channel 13a and/or each second branching channel 23a may be respectively inclined with respect to the first channel 12 and the second channel 22, and preferably respectively centered at the first channel 12 and the second channel 22 to be inclined toward the center. In this way, after passing through each second branching channel 23a and the second channel 22, the water streams are disturbed by each other, so as to enhance the effect of bubble collision and miniaturization.

The above-mentioned micro-bubble generator 100a further includes a sleeve 40 and an air vent perforation 50 penetrating the sleeve 40. The water inlet member 10a and the water outlet member 20a may be put into the sleeve 40 and fixed, while the gas inlet gap 30 is communicated with the air vent perforation 50. In addition, the first main body 11a and the second main body 21a are provided, at one side connected to the sleeve 40, with a recess 112, 212, and a packing ring 113, 213 located within the recess 112, 212, respectively. Thereby, the first main body 11a and the second main body 21a may be abutted against each other, while external air is allowed to flow into the boundary between the first junction surface 111 and the second junction surface 211 through the air vent perforation 50.

Figure 5:
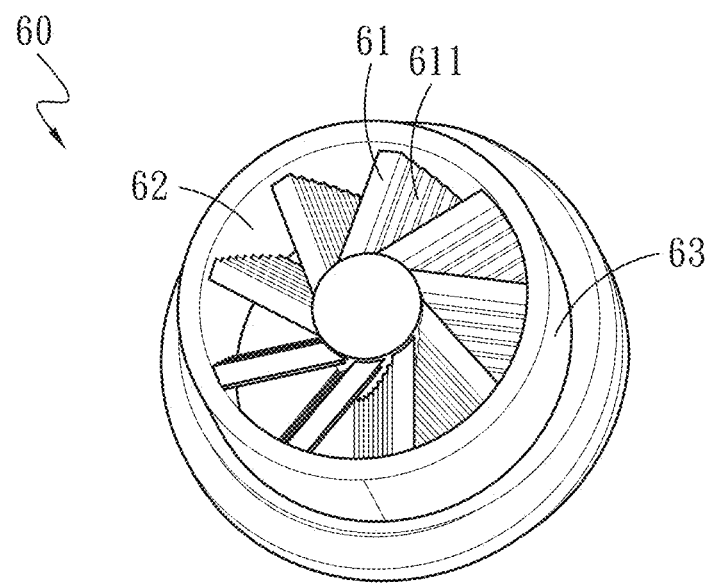
FIG. 5 is a perspective view of an eddy current guiding pipe of the present invention.

In addition, referring to FIG. 5, the above-mentioned micro-bubble generator 100a further includes an eddy current guiding pipe 60 located at one end, adjacent to the second main body 21a, of the sleeve 40, the eddy current guiding pipe 60 including a plurality of blades 61 in a spiral manner, a plurality of eddy current passages 62, wherein each of the plurality of eddy current passages 62 is arranged between two of the plurality of blades 61, and an outer casing tube 63 surrounding the plurality of blades 61 and the plurality of eddy current passages 62, a plurality of stepped surfaces 611 being provided on a surface of each of the plurality of blades 61 corresponding to each of the plurality of eddy current passages 62. Each eddy current passage 62 formed by each blade 61 is allowed to accelerate the water stream, while collision force generated by the collision of the water stream on each stepped surface 611 is allowed to split gas-containing composition of water again into tinier bubbles, when the water stream flows through the water outlet member 20a to the eddy current guiding pipe 60. The present invention may enable the water stream expelled from the water outlet device 900 to contain a large amount of fine bubbles, and further, the enhancement of washing ability of discharged water, through the above structure.

Figure 6:
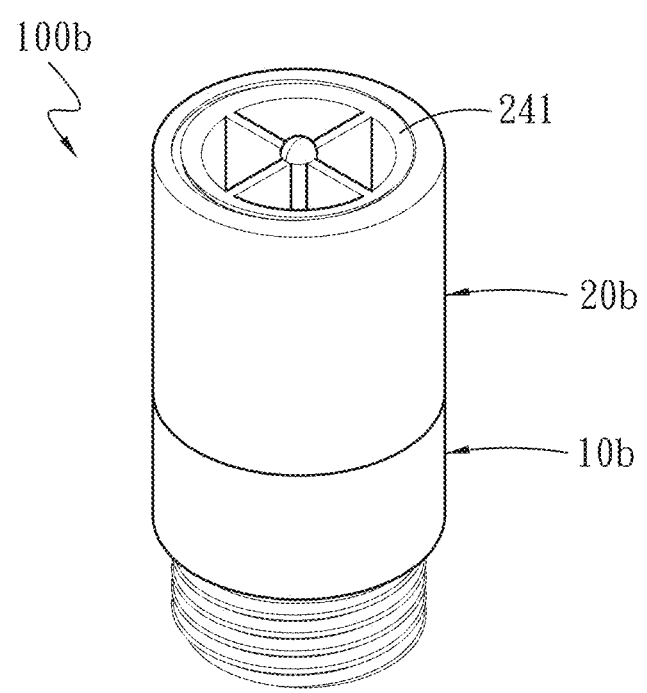
FIG. 6 is an assembled perspective view of a second embodiment of the present invention.
Figure 7:
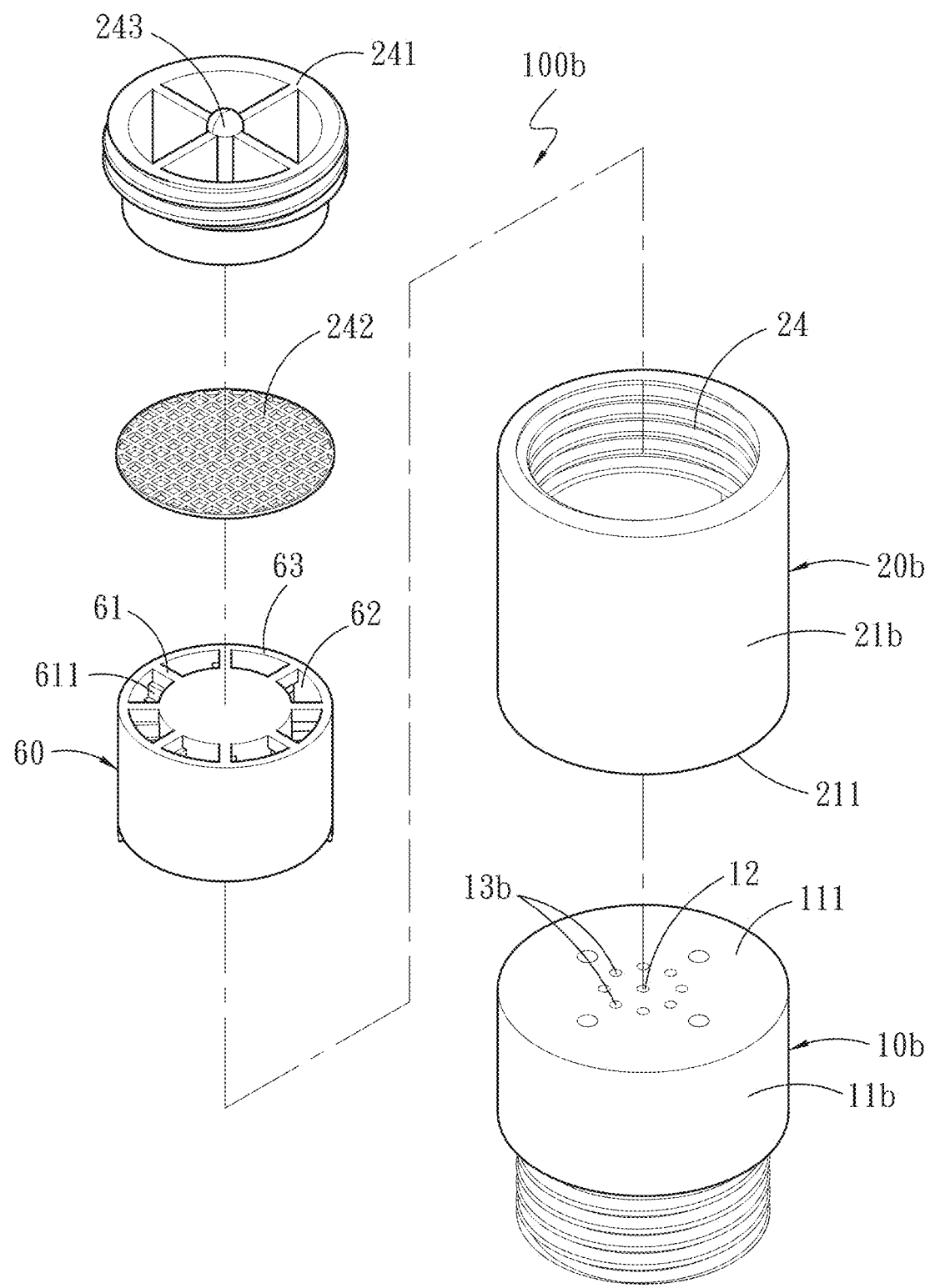
FIG. 7 is a disassembled perspective view of the second embodiment of the present invention.
Figure 8:
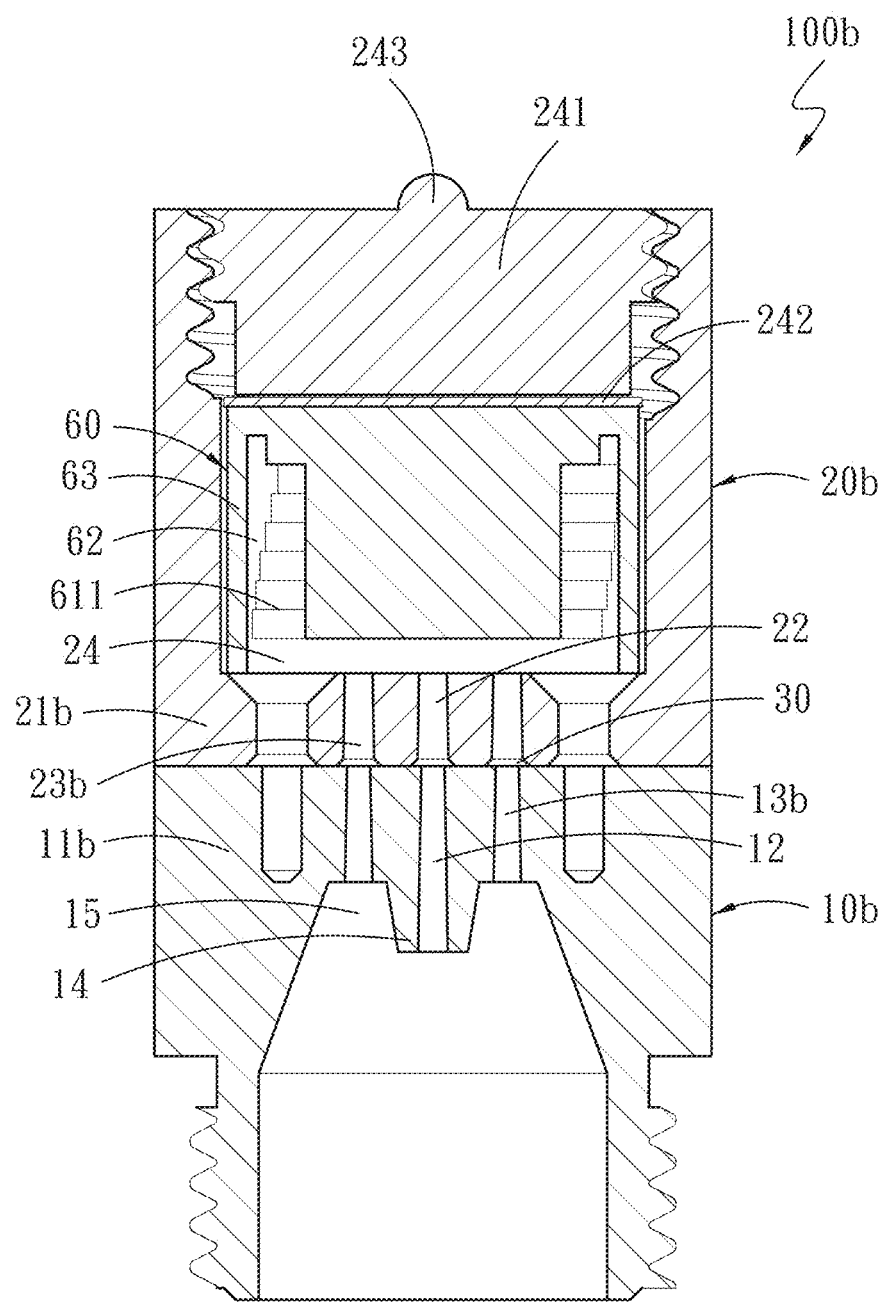
FIG. 8 is a cross-sectional view of the second embodiment of the present invention.
Figure 9:
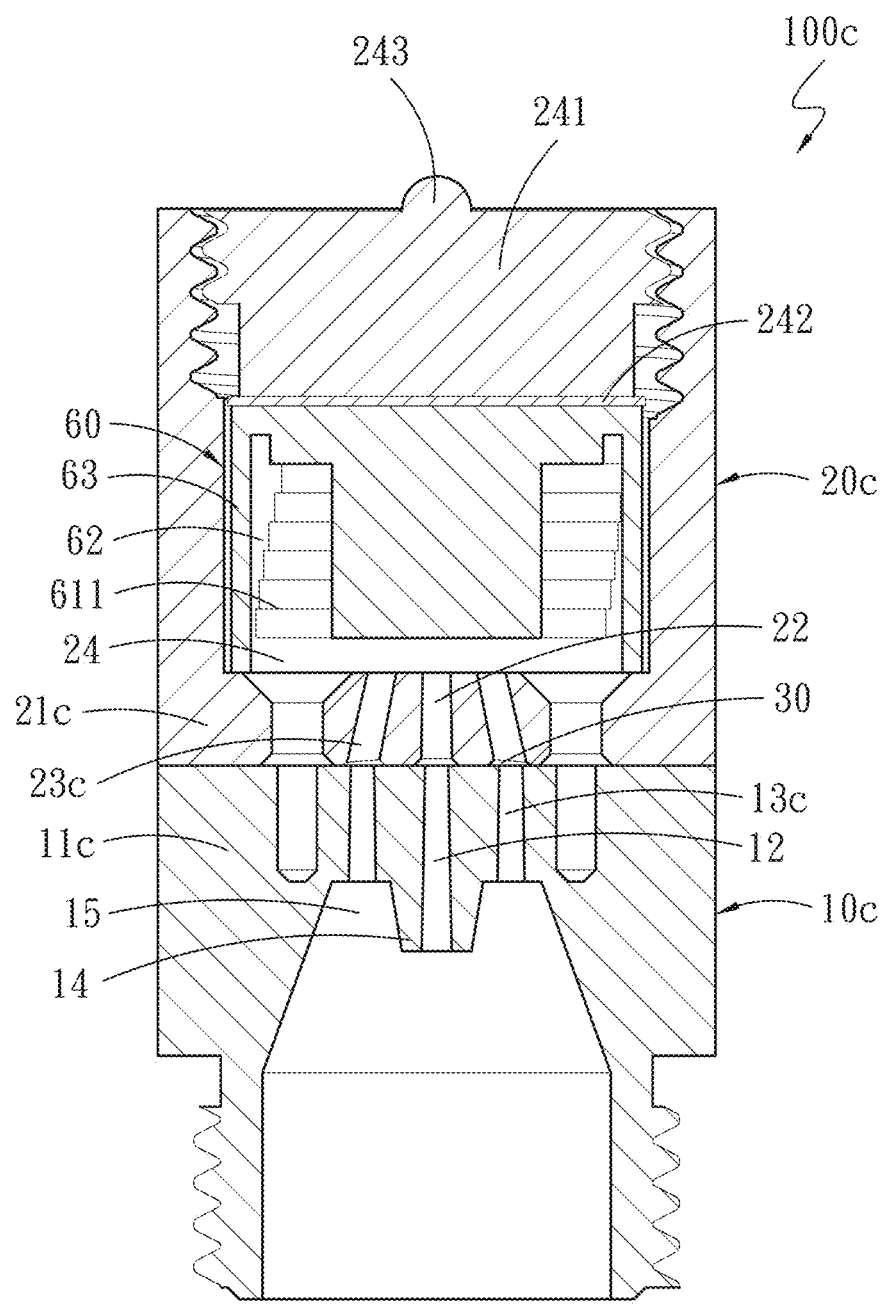
FIG. 9 is a cross-sectional view of a third embodiment of the present invention.
Figure 10:
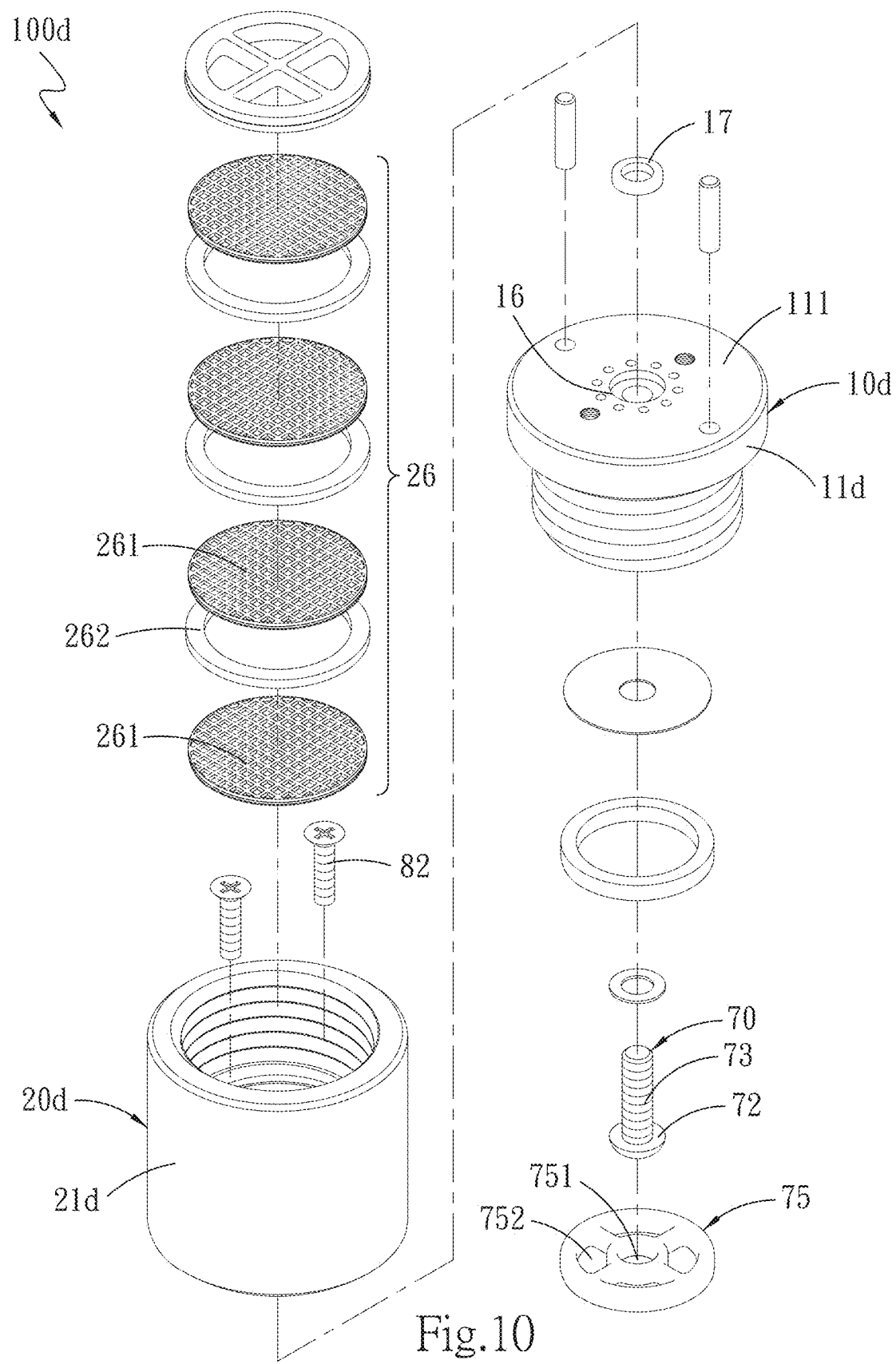
FIG. 10 is a disassembled perspective view of a fourth embodiment of the present invention.
Figure 11A:
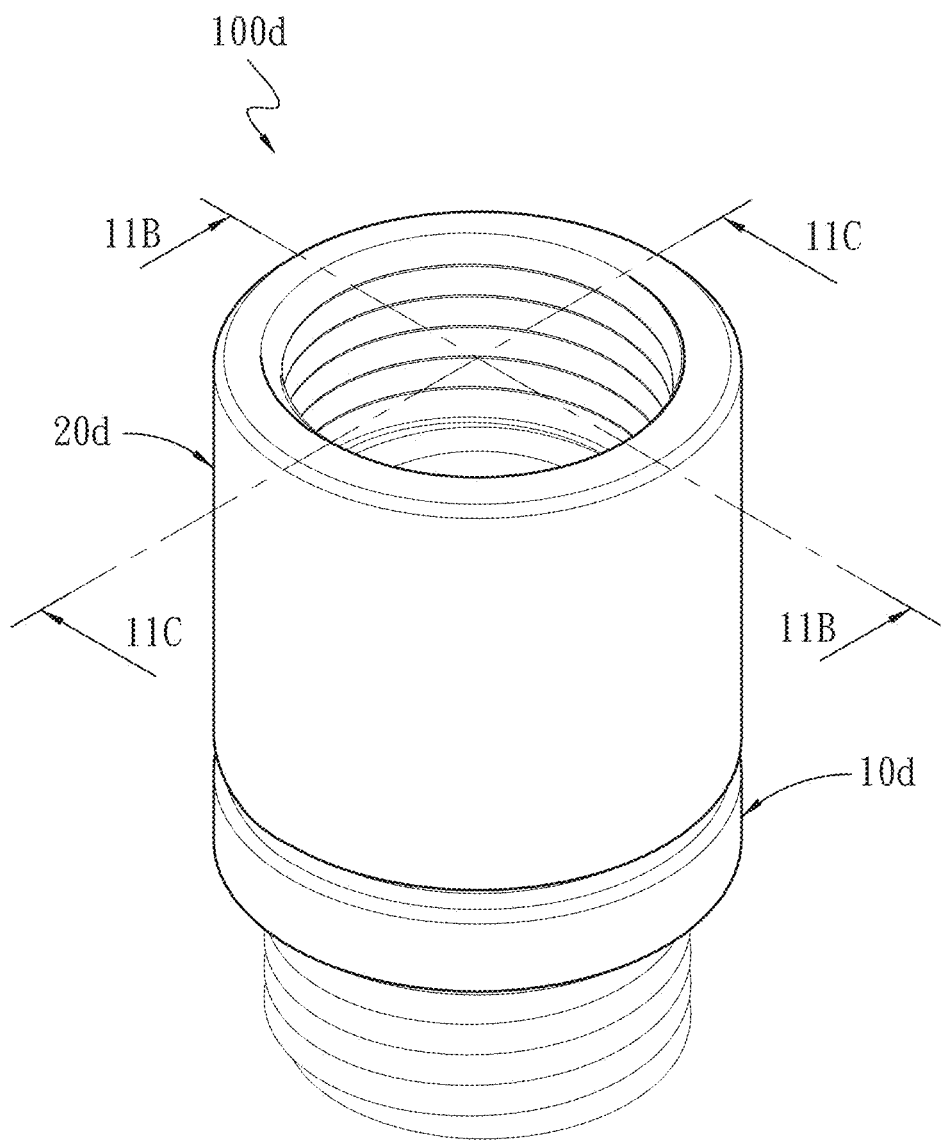
FIG. 11A is an assembled perspective view of the fourth embodiment of the present invention.
Figure 11B:
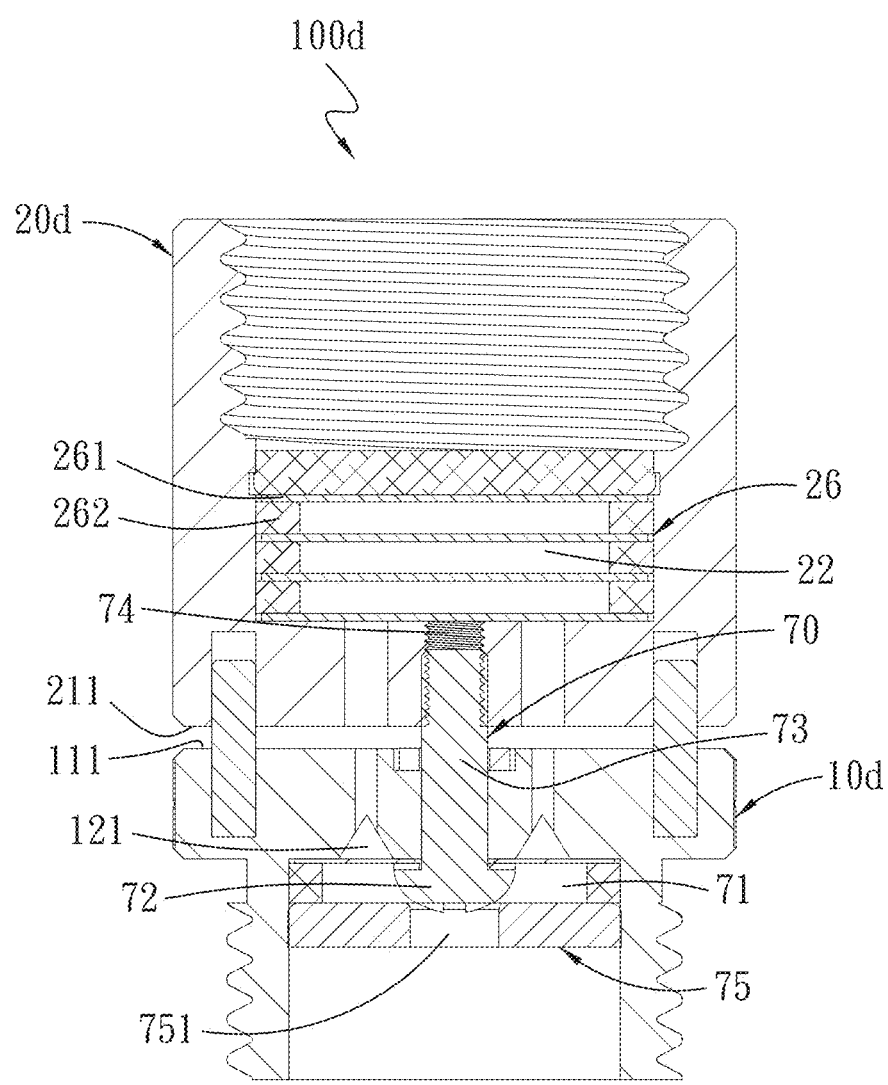
FIG. 11B is a cross-sectional view along 11B-11B in FIG. 11A of the present invention.
Figure 11C:
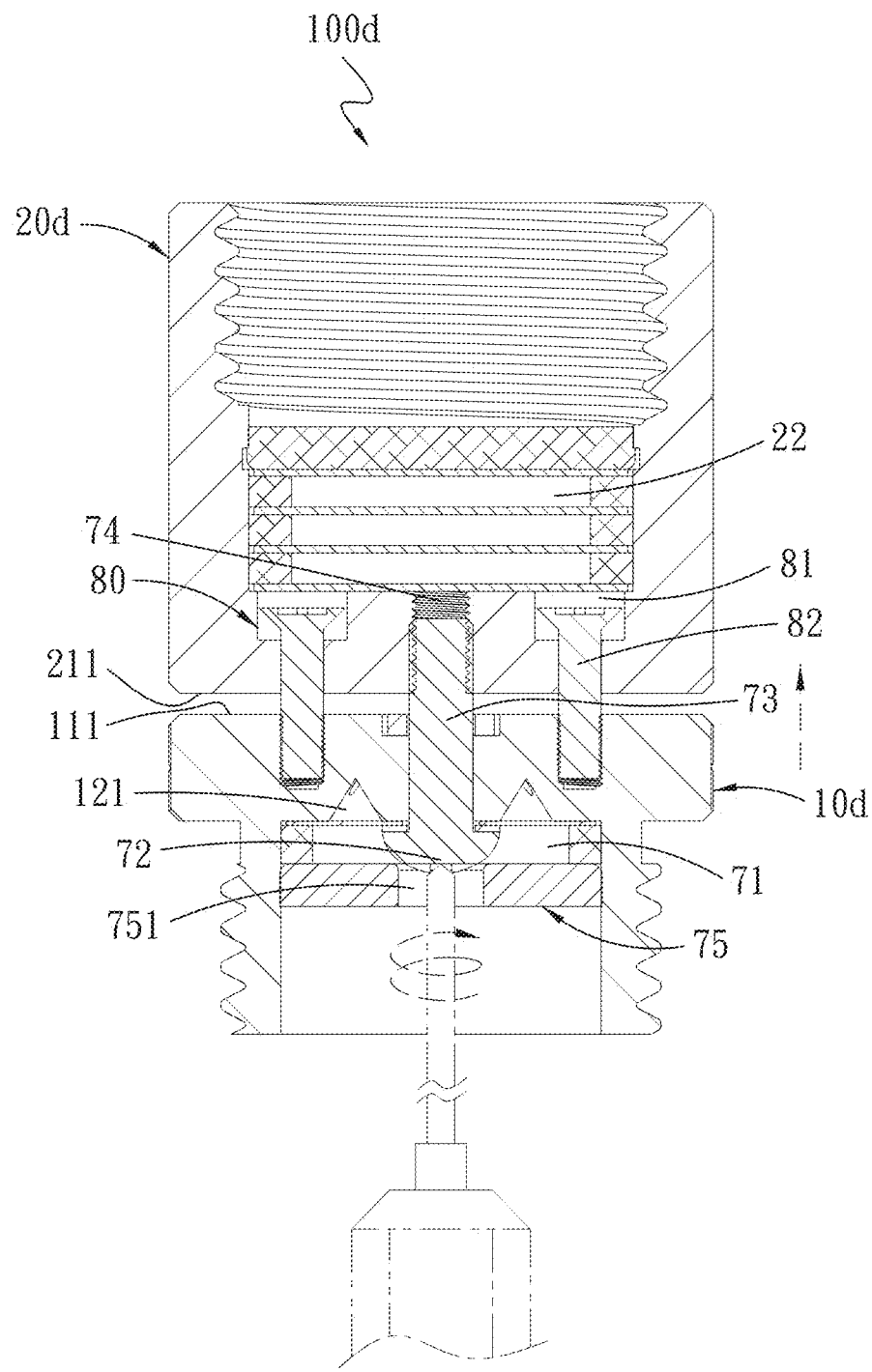
FIG. 11C is a cross-sectional view along 11C-11C in FIG. 11A of the present invention.
Figure 12A:
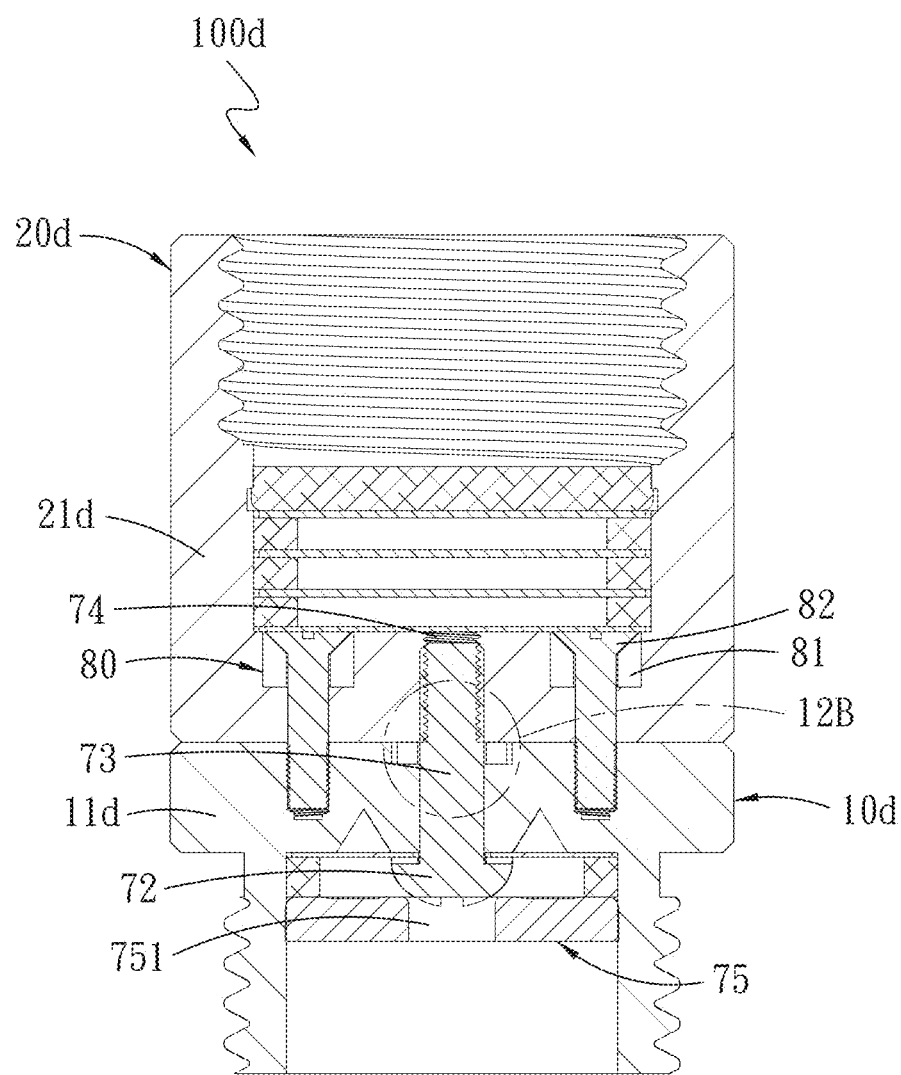
FIG. 12A is a cross-sectional view of the fourth embodiment of the present invention.
Figure 12B:
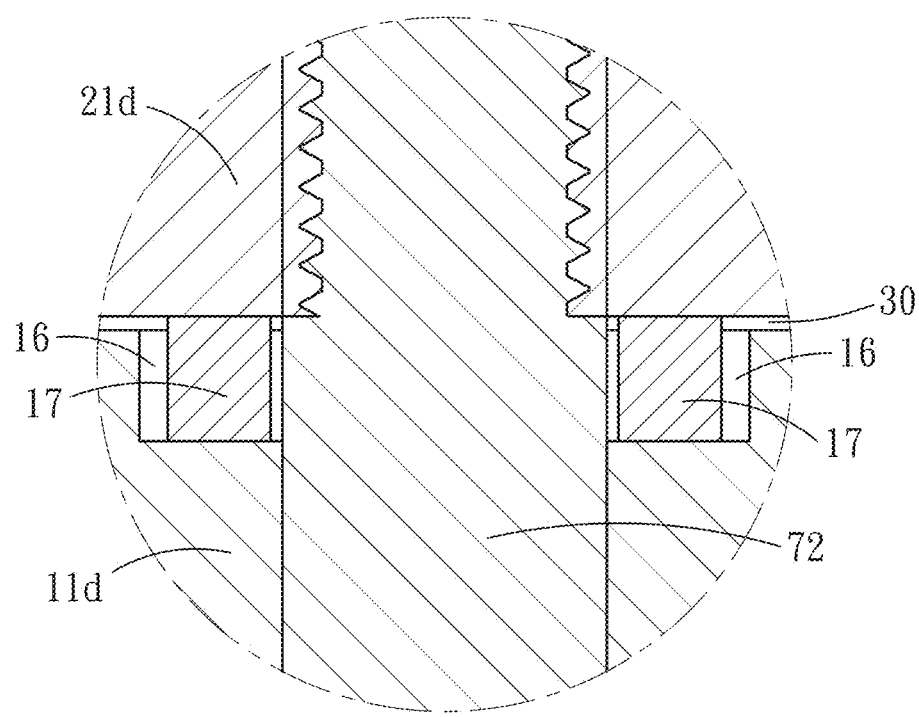
FIG. 12B is an enlarged partial view of FIG. 12A of the present invention.

In a second embodiment of the present invention, referring to FIGS. 6, 7, and 8, each of the water inlet member 10b and the water outlet member 20b is in the form of a cylinder, respectively. The bottom surface of the water inlet member 10b is the first junction surface 111 and the bottom surface of the water outlet member 20b is the second junction surface 211. The water outlet member 20b includes a water outlet chamber 24 adjacent to the output end 920 and connected to the second main body 21b. The water outlet chamber 24 may be similarly provided therein with the aforementioned eddy current guiding pipe 60, so as to enhance gas content of discharged water and increase the fineness of bubble. In this embodiment, each first branching channel 13b, each second branching channel 23b, the first channel 12 and the second channel 22 are all parallel to one another. In a third embodiment, referring to FIG. 9, each first branching channel 13c and the first channel 12 are parallel to each other, while each second branching channel 23c and the second channel 22 are inclined toward the center, the merits of which are lower cost of manufacturing the mold, together with canted guidance of water stream for the generation of disturbance.

In addition, the water outlet member 20c includes a through-hole end cap 241 located, correspondingly to the output end 920, in the second main body 21c, and a bubble-miniaturizing net 242 located between the through-hole end cap 241 and the second main body 21c. The through-hole end cap 241 is used for diverging the water stream so as to achieve, similarly to each first branching channel 13c and each second branching channel 23c, the effect of disturbance. The large-volume bubble may be divided again into smaller bubbles, when the water stream passes through the bubble-miniaturizing net 242. In addition, the water outlet member 20c includes a projecting edge 243 extending toward the output end 920 from the through-hole end cap 241. An action of guidance is provided by the projecting edge 243 for guiding the water stream, when passing through the through-hole end cap 241, to flow along the axle center of the projecting edge 243.

In a fourth embodiment, referring to FIGS. 10, 11A, 11B, 11C, 12A and 12B, the above-mentioned micro-bubble generator 100d is depressedly provided, on either the first junction surface 111 or the second junction surface 211, with a gasket groove 16. In the gasket groove 16, a gasket 17 slightly projecting outside of the gasket groove 16 is provided. Moreover, the drop between the gasket 17 and the gasket groove 16 is provided to remain the gas inlet gap 30 to the smallest extent between the first junction surface 111 and the second junction surface 211. In this embodiment, the gasket 17 is set as 1 mm in height. Specifically, the gasket 17 may be made of waterproof material with sufficient hardness, such as stainless steel and so on. Additionally, the gasket groove 16 is milled by a computer numerical control (CNC) machine tool to be a groove of 0.99 mm in height. Subsequently, the gasket 17 is placed, and the gas inlet gap 30 of 0.01 mm height is then formed, so as to reduce the volume of bubble.

Referring to FIG. 11C to 12A again, the above-mentioned micro-bubble generator 100d further includes a regulating part 70, the regulating part 70 including a regulating room 71 constituted by corresponding depressions between the first junction surface 111 and the second junction surface 211, a regulating screw head 72 rotatably connected in the regulating room 71, a regulating screw rod 73 passingly provided in the regulating room 71 and moved along with the regulating screw head 72, and an inner thread 74 located at the other end, opposite to the regulating screw head 72, of the regulating room 71, the regulating screw rod 73 being adjustably connected to the inner thread 74 by screw threads. A user may be allowed to adjust the spacing between the water outlet member 20d and the water inlet member 10d through the regulating part 70, so as to open the gas inlet gap 30 and clear impurities clogged in the gas inlet gap 30. Specifically, the regulating screw rod 73 may be riveted (not illustrated in the figures) at one end far away from the regulating screw head 72, after combined with the water outlet member 20d and the water inlet member 10d, such that the regulating screw rod 73 may be movable in a certain range based on the operation of the user, but it is impossible to take out the regulating screw rod 73 as a whole. Further, the regulating part 70 includes a fixing ring 75 fixing the regulating screw head 72 to the inner wall of the regulating room 71. The fixing ring 75 is openly provided with an operating through-hole 751 allowing a tool passing therethrough and operating the regulating screw head 72, and a plurality of water-passing holes 752 allowing the water stream passing therethrough. The first channel 12 may be provided at one side adjacent to the input end 910 with a flow-guiding passage 121 converged toward the first channel 12, so as to increase the speed of water stream and raise the efficiency of the subsequent generation of bubbles.

In addition, the micro-bubble generator 100d further includes a position-limiting part 80, the position-limiting part 80 including a position-limiting room 81 including corresponding depressions in the first junction surface 111 and the second junction surface 211, and a position-limiting bolt 82 movably provided in the position-limiting room 81. In this case, the regulating screw head 72 may be operated in a rotating manner to change the depth of screw-threaded connection between the regulating screw rod 73 and the inner thread 74, as well as drive the water inlet member 10d and the water outlet member 20d to be far away from or close to each other. Moreover, the maximum extent to which the water inlet member 10d and the water outlet member 20d are far away from each other is determined by the position-limiting part 80. In this embodiment, the interior space of the position-limiting room 81 may be provided for the position-limiting bolt 82 to be moved within a certain range. The object of the adjustment of the spacing between the water inlet member 10d and the water outlet member 20d without disconnecting these two members from each other may be obtained, if the position-limiting room 81 is formed in a shape having one wider end together with the other narrower end, and the top of the position-limiting bolt 82 is allowed to pass through the wider end while stuck at the narrower end.

For further increasing the amount and the density of bubbles in the present invention, the water outlet member 20d includes at least one bubble-multiplying part 26 provided at one side, far away from the first main body 11d, of the second main body 21d, the bubble-multiplying part 26 including a plurality of concentric spacing rings 262, and a plurality of multiplying nets 261 provided between the spacing rings 262, respectively. Each spacing ring 262 and the second main body 21d are closely fitted. The gas-liquid mixed liquid may be impacted to damage in the space, causing the separation provided by the spacing ring 262, when passing through each multiplying net 261, so as to make bubbles more minute and dense. Additionally, the amount of bubbles is then increased by cutting via another layer of multiplying net 261. The spacing due to the separation provided by each spacing ring 262 is dependent on the apertures of water inlet and outlet of the water inlet member 10d and the water outlet member 20d without limitation herein.

Figure 13:
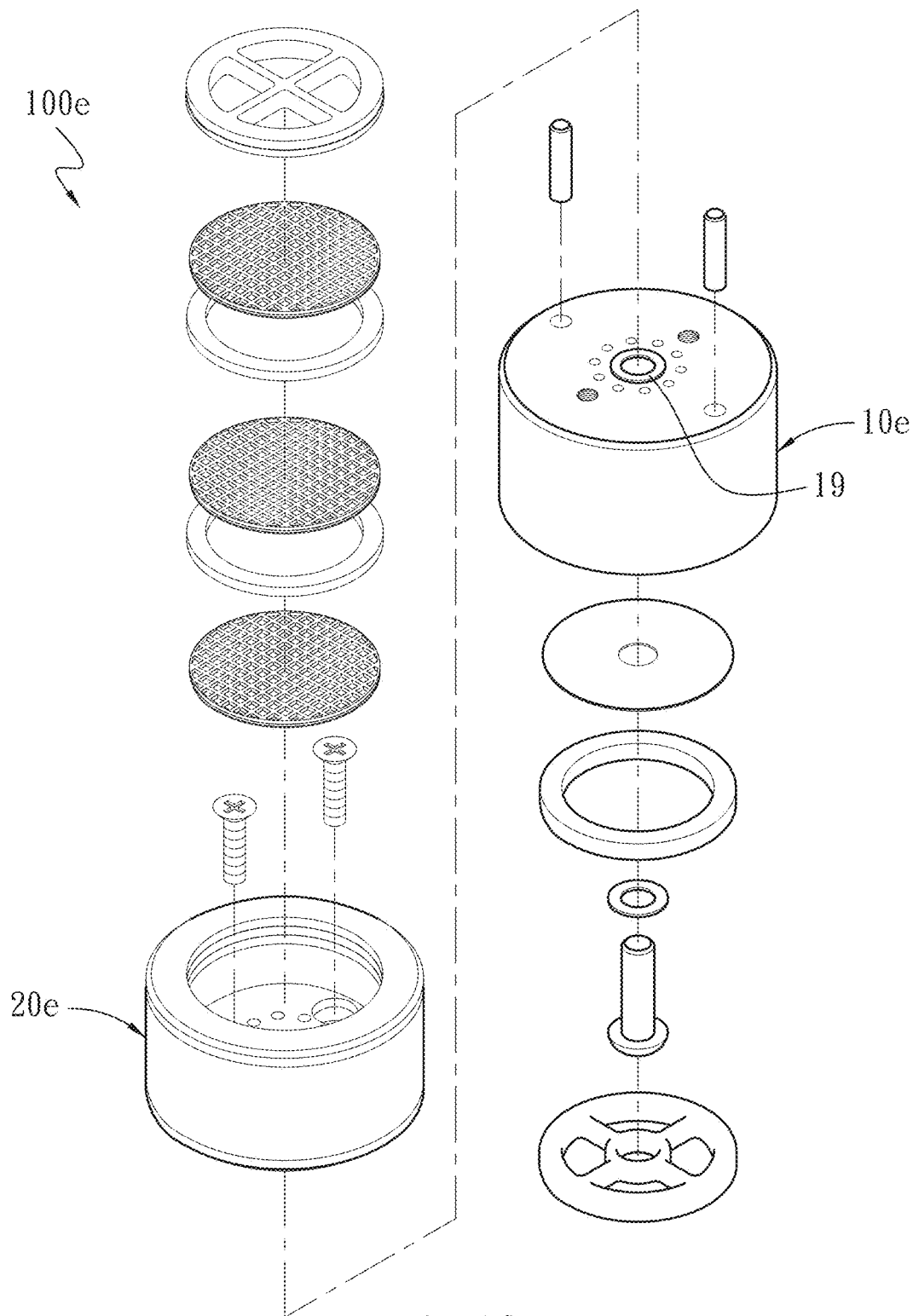
FIG. 13 is a disassembled perspective view of a fifth embodiment of the present invention.
Figure 14:
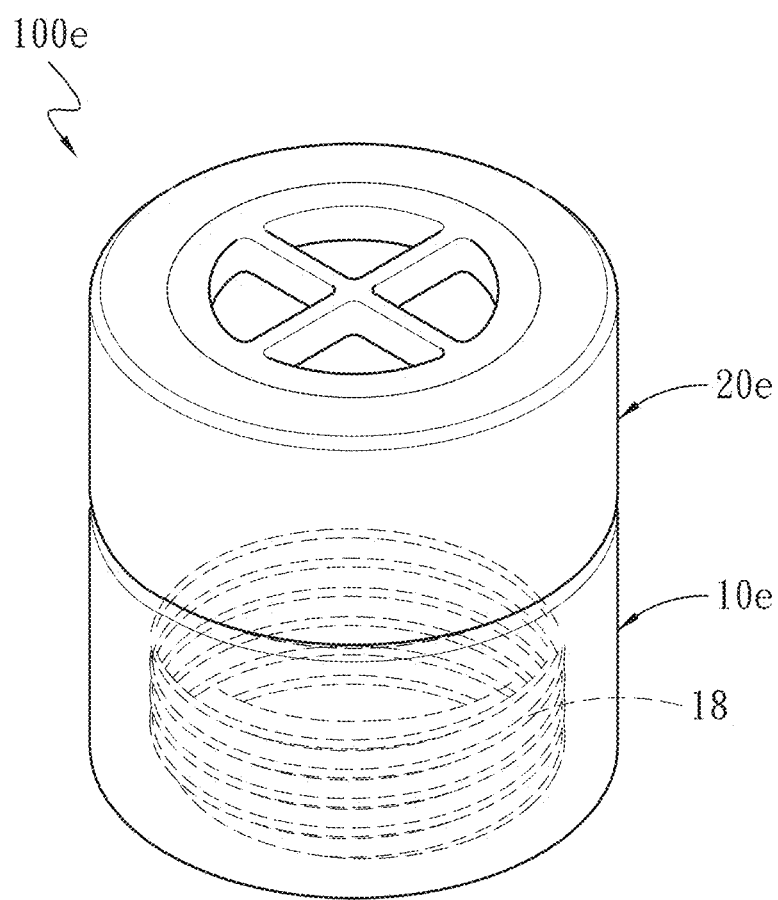
FIG. 14 is an assembled perspective view of the fifth embodiment of the present invention.

Referring to FIGS. 13 and 14, there is shown a fifth embodiment of the present invention. In this case, the water inlet member 10e of the micro-bubble generator 100e is provided at the bottom thereof with an adapting screwed groove 18 in the form of threads. The adapting screwed groove 18 may be connected to a water pipe having a joint, while the water outlet member 20e is connected to the water outlet device 900, such as shower head and so on, in such a way that a large amount of bubbles are generated when water is discharged, so as to enhance the effect of washing. In this embodiment, the water inlet member 10e is projectingly provided on the first junction surface 111 with an embossing gasket 19, the embossing gasket 19 being used for maintaining the gas inlet gap 30 between the water inlet member 10e and the water outlet member 20e when the two members are abutted against each other.

Figure 15A:
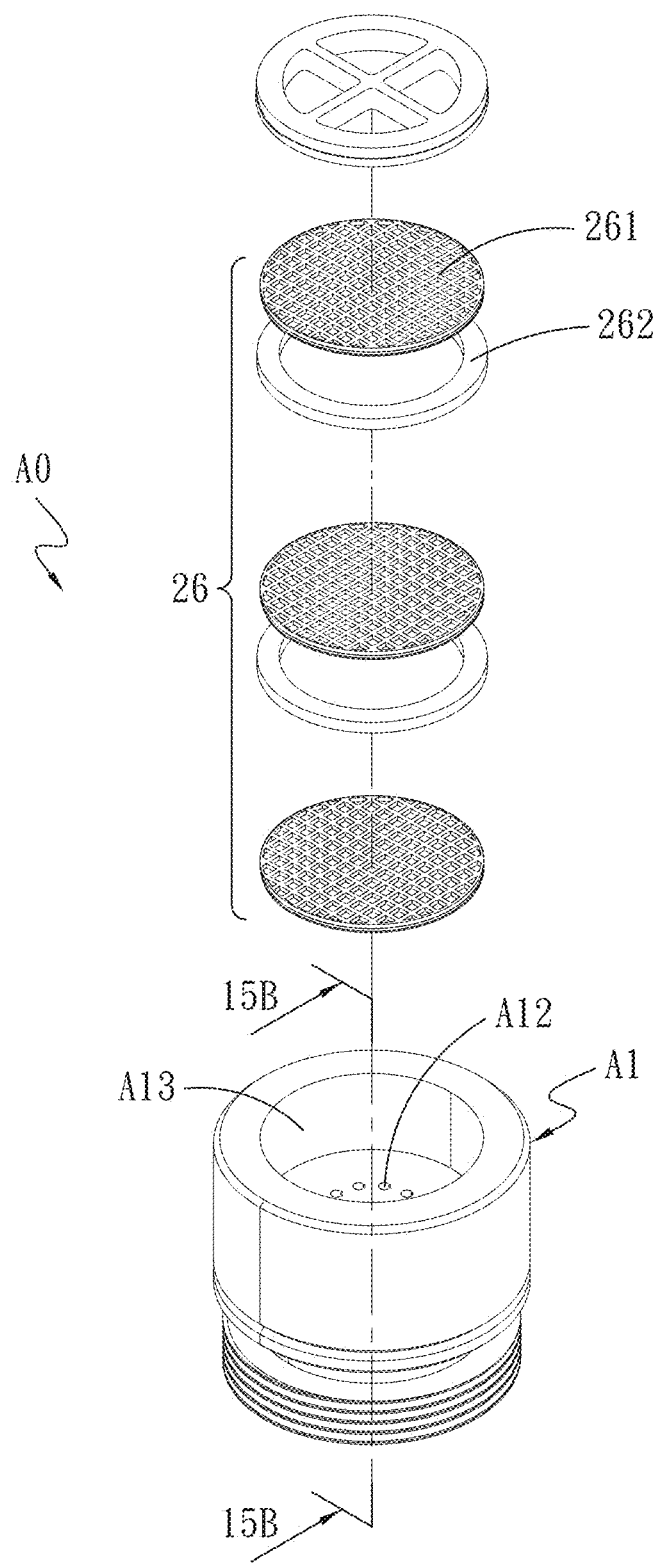
FIG. 15A is a disassembled perspective view of a sixth embodiment of the present invention.
Figure 15B:
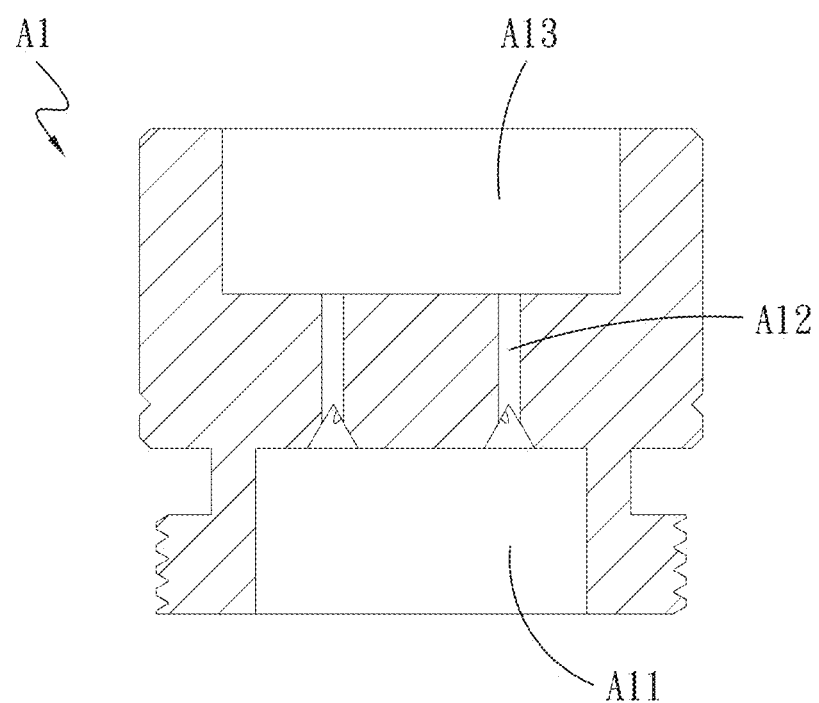
FIG. 15B is a cross-sectional view along 15B-15B in FIG. 15A of the present invention.

Referring to FIGS. 15A and 15B, there is shown a sixth embodiment of the present invention. A micro-bubble generator A0 includes an accommodating part A1 and a bubble-multiplying part 26. The accommodating part A1 includes a first accommodating trough A11 adjacent to the input end 910, a plurality of accommodating channels A12 communicated with the first accommodating trough A11, and a second accommodating trough A13 adjacent to the output end 920 and communicated with each accommodating channel A12. The bubble-multiplying part 26 includes the plurality of spacing rings 262 concentrically provided within the second accommodating trough A13, and the plurality of multiplying nets 261 provided between the spacing rings 262, respectively. In this embodiment, each spacing ring 262 is preferably 0.2 to 1 mm in height, while the mesh size of each multiplying net 261 is in the range of 0.048 to 0.3 mm. The micro-bubble generator A0 may be suitable for the liquid containing air itself, such as tap water and so on, according to the above structure. The object of increasing bubble density is further obtained by dividing and hitting air in water via the bubble-multiplying part 26.

Figure 16A:
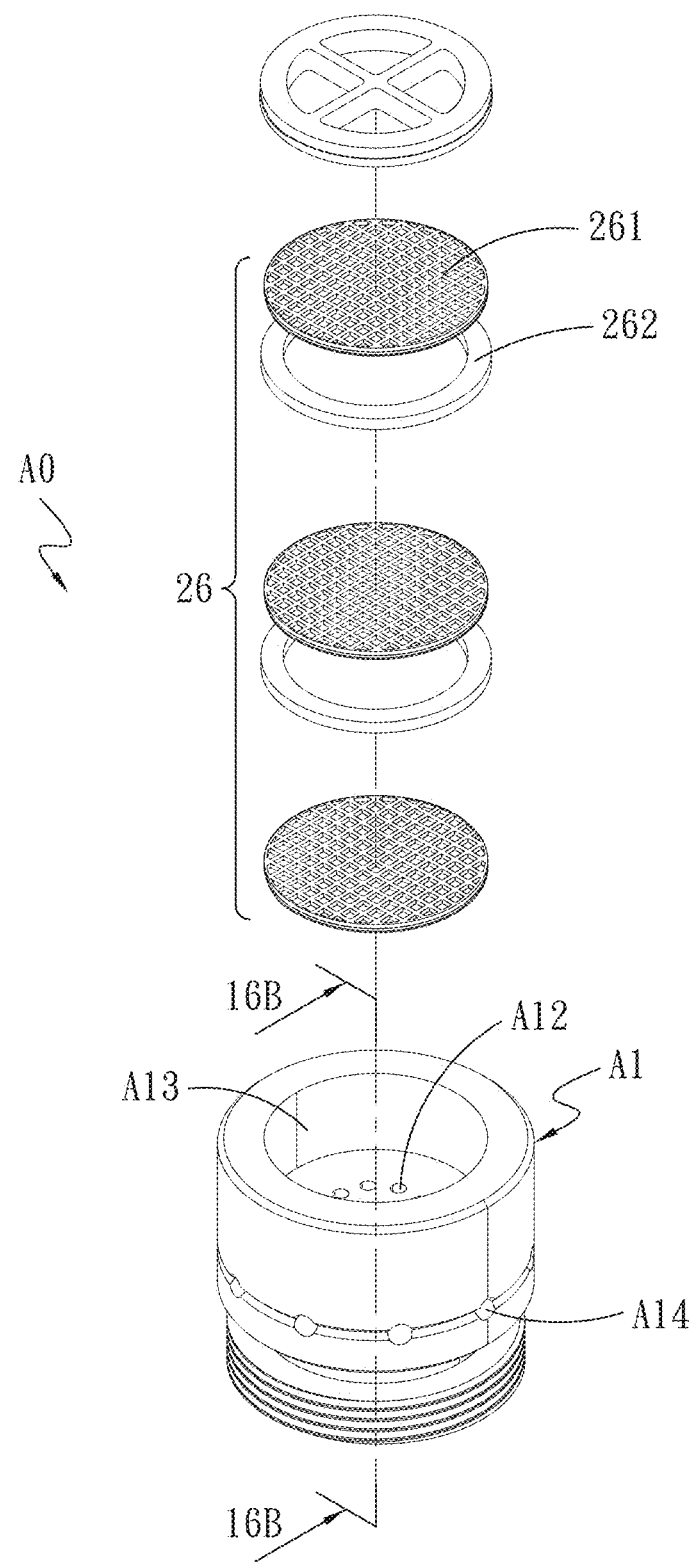
FIG. 16A is a disassembled perspective view of a seven embodiment of the present invention.
Figure 16B:
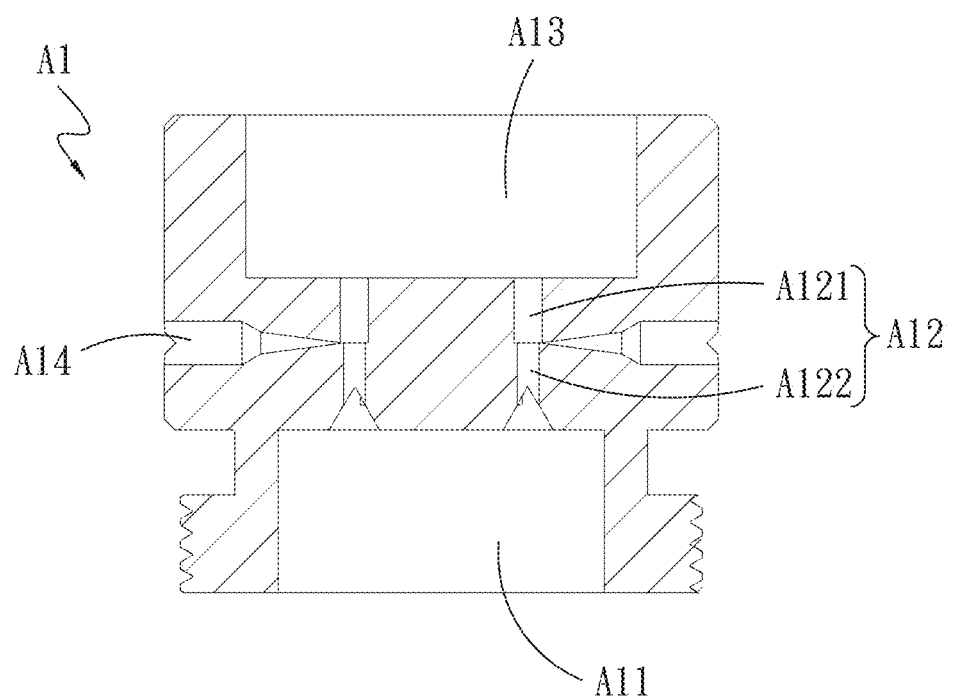
FIG. 16B is a cross-sectional view along 16B-16B in FIG. 16A of the present invention.

In addition, referring to FIGS. 16A and 16B, there is shown a seventh embodiment of the present invention. This embodiment and the sixth embodiment are substantially the same, with the difference in that the micro-bubble generator A0 includes a plurality of air vent perforations A14 communicating the exterior with each accommodating channel A12. Each of the plurality of air vent perforations A14 is tapered in aperture from the exterior toward the accommodating channel A12 to be an extremely tiny gas hole. Furthermore, the accommodating channel A12 includes an output channel A121 adjacent to the output end 920, and an input channel A122 adjacent to the input end 910, wherein each of the plurality of air vent perforations A14 is communicated with the boundary between the output channel A121 and the input channel A122. The diameter of the input channel A122 is slightly smaller than that of the output channel A121, so as to generate Venturi effect.

What is claimed is:

1. A micro-bubble generator provided between an input end and an output end of a water outlet device, said micro-bubble generator comprising:
   a water inlet member, including a first main body adjacent to said input end, and a first channel penetrating said first main body, said first main body being provided at one end penetrated by said first channel with a first junction surface; and
   a water outlet member, including a second main body adjacent to said output end, and a second channel penetrating said second main body, said second main body being provided at one end penetrated by said second channel with a second junction surface, and said second main body is provided with a sleeve at other end opposite to said second channel, wherein said sleeve is arranged annularly toward said output end;
   wherein said water inlet member and said water outlet member are abutted against each other, with said first junction surface facing said second junction surface, said first channel being communicated with said second channel, and at least one of said first junction surface and said second junction surface are provided with a plurality of chiseled shallow recesses which respectively forms a gas inlet gap after said first junction surface being engaged with said second junction surface, said gas inlet gap communicating external air to said first channel and said second channel.

2. The micro-bubble generator according to claim 1, wherein each gas inlet gap is provided with an air vent perforation at an outer side wall of said first main body adjacent to an outer side wall of said second main body.

3. The micro-bubble generator according to claim 1, wherein said sleeve of said second main body comprises a water outlet chamber adjacent to said output end, and an inner side wall of said second main body comprises an internal screw thread adjacent to said water outlet chamber.

4. The micro-bubble generator according to claim 3, wherein said second main body is locked with an eddy current guiding pipe at said internal screw thread of said water outlet chamber of said sleeve, and said eddy current guiding pipe comprises a plurality of blades arranged in a spiral manner, a plurality of eddy current passages respectively arranged between two of said plurality of blades, and an outer casing tube surrounding said plurality of blades and said plurality of eddy current passages, and wherein a plurality of stepped surfaces are provided on a surface of each of said plurality of blades corresponding to each of said plurality of eddy current passages.

5. The micro-bubble generator according to claim 3, wherein said second main body is locked with a through-hole end cap at said internal screw thread of said water outlet chamber of said sleeve adjacent to said output end, and a bubble-multiplying part disposed between said through-hole end cap and said second main body.

6. The micro-bubble generator according to claim 5, wherein said bubble-multiplying part comprises at least one multiplying net and at least one spacing ring connected to said multiplying net.

7. The micro-bubble generator according to claim 1, wherein said micro-bubble generator further comprises a regulating part which includes a regulating room constituted by a depression in an opposite side of said first junction surface of said first main body, a regulating screw rod penetrating said first main body and locked with said second main body, and an inner thread screwedly threaded with said regulating screw rod.

8. The micro-bubble generator according to claim 7, wherein said regulating screw rod is fixed in said regulating room by riveting.

9. The micro-bubble generator according to claim 7, wherein said micro-bubble generator further comprises a position-limiting part, said position-limiting part including a position-limiting room constituted by corresponding depressions in said first junction surface and said second junction surface, and a position-limiting bolt movably provided in said position-limiting room, and wherein said regulating screw rod is operated in a rotating manner to change a depth of screw-threaded connection between said regulating screw rod and said inner thread.

10. The micro-bubble generator according to claim 7, wherein said regulating part includes a regulating screw head moved along with said regulating screw rod, a fixing ring fixing said regulating screw head to an inner wall of said regulating room, said fixing ring being openly provided with an operating through-hole allowing a tool passing therethrough and operating said regulating screw head, and a plurality of water-passing holes allowing water stream passing therethrough.

11. The micro-bubble generator according to claim 1, wherein one of said first junction surface and said second junction surface is depressedly provided with a gasket groove which is accommodated with a gasket.

12. The micro-bubble generator according to claim 11, wherein said gasket is further an embossing gasket, and a drop between said embossing gasket and said gasket groove is provided to form another gas inlet gap between said first junction surface and said second junction surface when said first junction surface and said second junction surface are abutted against each other.

13. The micro-bubble generator according to claim 1, wherein a diameter of said second channel is greater than a diameter of said first channel.

14. The micro-bubble generator according to claim 2, wherein each gas inlet gap is tapered from said corresponding air vent perforation toward an engagement between said communicated first channel and second channel.

15. The micro-bubble generator according to claim 1, wherein an inner side wall of said water inlet member adjacent to said input end is provided with an adapting screwed groove.

* * * * *